(12) United States Patent
Shidore et al.

(10) Patent No.: US 12,362,695 B1
(45) Date of Patent: Jul. 15, 2025

(54) SYSTEM FOR GENERATING THERMAL HEAT IN AN ELECTRIC POWER SYSTEM AND AN ELECTRIFIED POWERTRAIN

(71) Applicant: GM GLOBAL TECHNOLOGY OPERATIONS LLC, Detroit, MI (US)

(72) Inventors: Neeraj S. Shidore, Novi, MI (US); Chandra S. Namuduri, Troy, MI (US); Satish P. Ketkar, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 49 days.

(21) Appl. No.: 18/414,809

(22) Filed: Jan. 17, 2024

(51) Int. Cl.
  *H01M 10/63* (2014.01)
  *B60L 15/00* (2006.01)
  *B60L 50/60* (2019.01)
  *H02P 27/08* (2006.01)

(52) U.S. Cl.
  CPC ............ *H02P 27/08* (2013.01); *B60L 15/007* (2013.01); *B60L 50/60* (2019.02); *B60L 2210/40* (2013.01)

(58) Field of Classification Search
  CPC ..... H02P 27/08; H01M 10/63; H01M 10/615; H01M 10/486; H01M 10/625; H02M 3/1588
  See application file for complete search history.

(56) References Cited

U.S. PATENT DOCUMENTS

| | | | |
|---|---|---|---|
| 2008/0197810 A1* | 8/2008 | Ishikawa | B60L 15/209 320/135 |
| 2017/0012445 A1* | 1/2017 | Takemura | H01M 10/441 |
| 2017/0131379 A1* | 5/2017 | Omata | G01R 31/343 |
| 2019/0106002 A1* | 4/2019 | Götz | B60L 50/60 |
| 2020/0144684 A1* | 5/2020 | Takamatsu | H01M 10/637 |
| 2022/0069755 A1* | 3/2022 | Lee | H02J 7/2434 |
| 2024/0429481 A1* | 12/2024 | Xu | H01M 10/63 |

FOREIGN PATENT DOCUMENTS

| | | |
|---|---|---|
| DE | 102022111169 A1 | 2/2023 |
| DE | 102022128215 A1 | 12/2023 |

* cited by examiner

*Primary Examiner* — Jared Fureman
*Assistant Examiner* — Esayas G Yeshaw
(74) *Attorney, Agent, or Firm* — Quinn IP Law

(57) ABSTRACT

An electric power system has a power inverter system with a quasi-resonant circuit (QRC), and a controller, and couples a DC power supply to an electric machine. The power inverter system includes a positive inverter bus and a negative inverter bus; first paired switches; a positive DC bus terminal; and a negative DC bus terminal. The QRC includes an inverter inductance device, a capacitor, a first bus switch, and a second bus switch. The inverter inductance device and the second bus switch are arranged in series between the positive inverter bus and the first switch node, and the first bus switch is arranged between the positive DC bus terminal and the positive inverter bus. The controller is configured to control the QRC to generate an alternating current in the DC power supply.

20 Claims, 6 Drawing Sheets

SYSTEM FOR GENERATING THERMAL HEAT IN AN ELECTRIC POWER SYSTEM AND AN ELECTRIFIED POWERTRAIN

BACKGROUND

This disclosure relates to multi-phase inverter circuits for electric motor/generators, including architectures that are capable of inducing heat generation in an attached DC power supply without employing an external heater such as a convective heat source e.g., a positive-temperature-coefficient or PTC heater.

SUMMARY

There is a benefit for having an architecture for an inverter circuit for an electric machine that is capable of inducing heat generation in an attached DC power supply that utilizes electric power from the DC power supply, without employing an external heater such as a convective source (e.g., a positive-temperature-coefficient or PTC heater).

The disclosure provides, in one embodiment, an architecture for an electric power system, e.g., for an electrified drivetrain for a vehicle, that includes an power inverter that incorporates elements of a quasi-resonant circuit (QRC) that is capable of generating an AC current in a DC power bus under certain operating conditions, wherein the AC current results in self-heating of an attached DC power supply due to the AC current passing through the self impedance of the DC power supply.

An aspect of the disclosure may include an electric power system having a power inverter system with a quasi-resonant circuit (QRC), and a controller. The power inverter system is arranged to couple a DC power supply to an electric machine. The power inverter system includes: a positive inverter bus and a negative inverter bus; first paired switches arranged in series between the positive inverter bus and the negative inverter bus and joined at a first switch node; a positive DC bus terminal; and a negative DC bus terminal. The QRC includes an inverter inductance device, a capacitor, a first bus switch, and a second bus switch, with the capacitor being connected between the positive inverter bus and the negative inverter bus. The inverter inductance device and the second bus switch are arranged in series between the positive inverter bus and the first switch node arranged between the first paired switches, and the first bus switch is arranged between the positive DC bus terminal and the positive inverter bus. The controller is configured to control the QRC to generate an alternating current in the DC power supply.

Another aspect of the disclosure may include the controller being configured to control the first bus switch and the second bus switch to generate, via the inverter inductance device and the capacitor, the alternating current in the DC power supply.

Another aspect of the disclosure may include the controller controlling the first bus switch to an open state and the second bus switch to a closed state to generate, via the inverter inductance device and the capacitor, the alternating current in the DC power supply.

Another aspect of the disclosure may include the controller controlling the first bus switch to the open state and the second bus switch to the closed state to generate, via the inverter inductance device and the capacitor, the alternating current in the DC power supply to generate thermal energy in the DC power supply.

Another aspect of the disclosure may include the controller controlling the second bus switch in a pulsewidth-modulated condition between an open state and a closed state to generate, via the inverter inductance device and the capacitor, the alternating current in the DC power supply.

Another aspect of the disclosure may include the first switch node being connected via an AC power bus to the electric machine to transfer a pulsewidth modulated power signal thereto.

Another aspect of the disclosure may include the power inverter system including second paired switches arranged in series between the positive inverter bus and the negative inverter bus and joined at a second switch node; wherein the QRC includes a third bus switch; wherein the inverter inductance device and the third bus switch are arranged in series between the positive inverter bus and the second switch node arranged between the second paired switches; and wherein the controller is configured to control the first bus switch, the second bus switch, and the third bus switch to generate, via the inverter inductance device and the capacitor, an alternating current in the DC power supply.

Another aspect of the disclosure may include the controller controlling the first bus switch to an open state and one of the second bus switch and the third bus switch to a closed state to generate, via the inverter inductance device and the capacitor, the alternating current in the DC power supply.

Another aspect of the disclosure may include the controller controlling the second bus switch employing a first pulsewidth-modulated signal between an open state and a closed state, and controlling the third bus switch employing a second pulsewidth-modulated signal to generate, via the inverter inductance device and the capacitor, the alternating current in the DC power supply.

Another aspect of the disclosure may include the controller controlling the power inverter system to operate in a non-traction mode, wherein the controller is configured to control the first bus switch and the second bus switch to generate, via the inverter inductance device and the capacitor, the alternating current in the DC power supply during operation in the non-traction mode.

Another aspect of the disclosure may include an electrified drivetrain that includes a DC power supply, a positive link and a negative link of a DC power bus, a power inverter system having a quasi-resonant circuit (QRC), an electric machine, and a controller. The electric machine is coupled via a geartrain to a torque actuator, and the power inverter system couples the DC power supply to the electric machine. The power inverter system includes: a positive inverter bus and a negative inverter bus; first paired switches arranged in series between the positive inverter bus and the negative inverter bus and joined at a first switch node; a positive DC bus terminal; and a negative DC bus terminal. The positive inverter bus is coupled to the positive link of the DC power bus, and the negative inverter bus is coupled to the negative link of the DC power bus. The DC power supply includes an electric power cell that is couplable via a first cell switch and a second cell switch to the positive link of the DC power bus, and the first cell switch is arranged in parallel with the second cell switch. The QRC includes an inductance device, a capacitor, a first bus switch, and a second bus switch; wherein the capacitor is connected between the positive inverter bus and the negative inverter bus; the inductance device and the second bus switch are arranged in series between the positive inverter bus and the first switch node arranged between the first paired switches; the first bus switch is arranged between the positive DC bus terminal and the positive inverter bus; and the controller is configured to control the QRC, the first cell switch, and the second cell switch to generate an alternating current in the DC power supply.

Another aspect of the disclosure may include an electrified drivetrain for a vehicle that includes a DC power supply, a positive link and a negative link of a DC power bus, a first multi-phase inverter system coupled to a first electric machine, a second multi-phase inverter system coupled to a second electric machine, a first driveline, and a controller. The positive link of the DC power bus includes a first cell switch, and a second cell switch arranged in series with an electrical resistor, wherein the first cell switch is arranged in parallel with the second cell switch arranged in series with the electrical resistor. The controller controls the first bus switch in an open state and the second bus switch in a closed state to generate thermal energy through the first multi-phase inverter system and the electrical resistor.

Another aspect of the disclosure includes one of the first bus switch or the second bus switch being an Insulated Gate Bipolar Transistor (IGBT).

Another aspect of the disclosure includes one of the first bus switch or the second bus switch being a gallium nitride (GaN) transistor.

Another aspect of the disclosure includes one of the first bus switch or the second bus switch being a silicon carbide (SiC) transistor.

The above features and advantages, and other features and advantages, of the present teachings are readily apparent from the following detailed description of some of the best modes and other embodiments for carrying out the present teachings, as defined in the appended claims, when taken in connection with the accompanying drawings.

BRIEF DESCRIPTION OF THE DRAWINGS

One or more embodiments will now be described, by way of example, with reference to the accompanying drawings, in which.

DETAILED DESCRIPTION

The components of the disclosed embodiments, as described and illustrated herein, may be arranged and designed in a variety of different configurations. Thus, the following detailed description is not intended to limit the scope of the disclosure, as claimed, but is merely representative of possible embodiments thereof. In addition, while numerous specific details are set forth in the following description in order to provide a thorough understanding of the embodiments disclosed herein, some embodiments can be practiced without some of these details. Moreover, for the purpose of clarity, certain technical material that is understood in the related art has not been described in detail in order to avoid unnecessarily obscuring the disclosure. Furthermore, the disclosure, as illustrated and described herein, may be practiced in the absence of an element that is not specifically disclosed herein. As used herein, the term "system" may refer to one of or a combination of mechanical and electrical hardware, sensors, controllers, application-specific integrated circuits (ASIC), combinatorial logic circuits, software, firmware, and/or other components that are arranged to provide the described functionality.

Figure 1:
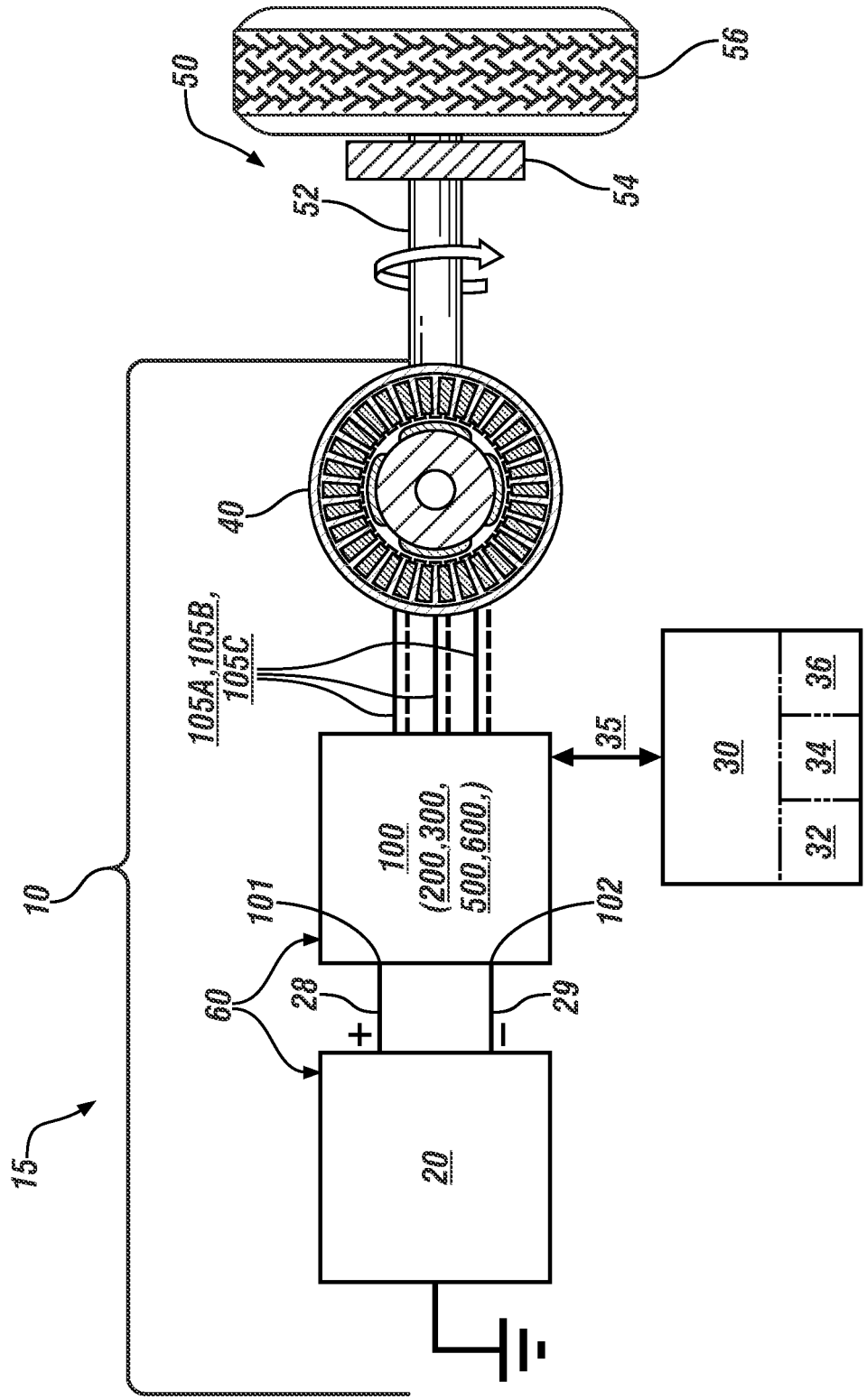
FIG. 1 schematically illustrates an embodiment of an electric power system that is arranged as an element of an electrified drivetrain for a vehicle, in accordance with the disclosure.

Referring now to the drawings, wherein the depictions are for the purpose of illustrating certain embodiments only and not for the purpose of limiting the same, FIGS. 1, et seq., schematically illustrate an electric power system 10 and various embodiments of a multi-phase inverter system 100, 200, 300, 500, or 600 that have been fabricated in accordance with the concepts described and claimed herein. Like reference numerals correspond to like or similar components throughout the several Figures and embodiments.

Referring again to FIGS. 1 and 2, the electric power system 10 includes multi-phase inverter system 100, DC power supply 20, electric machine 40, and controller 30, wherein the multi-phase inverter system 100 is controlled by the controller 30 to convert and transfer electric power between the DC power supply 20 and the electric machine 40 to generate torque (e.g., a propulsion mode) or generate electric power (e.g., a regenerative braking mode). In one embodiment, the electric power system 10 is an element of an electrified drivetrain 50 for a vehicle 15 to provide propulsion torque. The vehicle 15 may include, but not be limited to a mobile platform in the form of a commercial vehicle, industrial vehicle, agricultural vehicle, passenger vehicle, aircraft, watercraft, train, all-terrain vehicle, personal movement apparatus, robot and the like to accomplish the purposes of this disclosure. Alternatively, the electric power system 10 may be an element of a stationary system. The concepts described herein may be employed on both vehicle systems and stationary systems.

The controller 30 may be embodied as one or more digital computing devices and may include one or more processors 34 and memory 32. A control routine 36 may be stored as an executable instruction set in the memory 32 and executed by one of the processors 34 of the controller 30. The controller 30 is in communication with the multi-phase power inverter 100 via communication link 35 to control operation thereof in response to execution of the control routine 36, and thus to operate the electric machine 40.

The term "controller" and related terms such as control module, module, control, control unit, processor and similar terms refer to one or various combinations of Application Specific Integrated Circuit(s) (ASIC), electronic circuit(s), central processing unit(s), e.g., microprocessor(s) and associated non-transitory memory component(s) in the form of memory and storage devices (read only, programmable read only, random access, hard drive, etc.). The non-transitory memory component is capable of storing machine readable instructions in the form of one or more software or firmware programs or routines, combinational logic circuit(s), input/ output circuit(s) and devices, signal conditioning and buffer circuitry and other components that can be accessed by one or more processors to provide a described functionality. Input/output circuit(s) and devices include analog/digital converters and related devices that monitor inputs from sensors, with such inputs monitored at a preset sampling frequency or in response to a triggering event. Software, firmware, programs, instructions, control routines, code, algorithms and similar terms mean controller-executable instruction sets including calibrations and look-up tables. Each controller executes control routine(s) to provide desired functions. Routines may be executed at regular intervals, for example each 100 microseconds during ongoing operation. Alternatively, routines may be executed in response to occurrence of a triggering event. Communication between controllers, and communication between controllers, actuators and/or sensors may be accomplished using a direct wired point-to-point link, a networked communication bus link, a wireless link or another suitable communication link. Communication includes exchanging data signals in suitable form, including, for example, electrical signals via a conductive medium, electromagnetic signals via air, optical signals via optical waveguides, and the like. The data signals may include discrete, analog or digitized analog signals representing inputs from sensors, actuator commands such as transistor gate drivers, and communication between controllers. The term "signal" refers to a physically discernible indicator that conveys information, and may be a suitable waveform (e.g., electrical, optical, magnetic, mechanical or electromagnetic), such as DC, AC, sinusoidal-wave, triangular-wave, square-wave, vibration, and the like, that is capable of traveling through a medium.

As used herein, the term "electric machine" refers to a rotating electric motor, generator, or motor-generator device including a rotor and a stator that is capable of converting electric power to mechanical power and/or converting mechanical power to electric power by electromagnetic effort.

The electric machine 40 may include a cylindrically-shaped rotor assembly arranged on a rotor shaft and disposed within an annularly-shaped stator, wherein the rotor assembly is coaxial with a rotor opening that is formed in the stator. Other elements of the electric machine 40, e.g., end caps, shaft bearings, electrical connections, etc., are included but not shown. Electrical windings of the stator are arranged with a quantity of electrical phases and a quantity of electrical turns per phase. Depending on the specific arrangement, the quantity of electrical phases may be between 3 and 6, and the quantity of layers of conductors may be between 4 and 12.

The DC power source 20 connects to the multi-phase power inverter 100 via a high-voltage DC bus having a positive link 28 and a negative link 29, wherein the positive link 28 connects to the multi-phase power inverter 100 at a positive DC bus terminal 101, and the negative link 29 connects to the multi-phase power inverter 100 at a negative DC bus terminal 102.

The DC power source 20 includes one or a plurality of electric power cells 21, a first cell switch 22 which is arranged in parallel with a second cell switch 23 and electrical resistor 24, and inductor 25, which are arranged to transfer DC electric power to the multi-phase power inverter 100 via the positive link 28 and negative link 29 of the high-voltage DC bus.

The electric power cells 21 of the DC power source 20 may be one or multiple rechargeable electrochemical battery device(s), fuel cell(s), ultracapacitor(s), and/or another electrical energy storage/generation technology.

The multi-phase power inverter 100 connects to the electric machine 40 via a plurality of AC power buses 105A, 105B, 105C to transfer a pulsewidth modulation signal thereto. In one embodiment, each of the AC power buses 105A, 105B, 105C is arranged as a single wire lead that electrically connects between the multi-phase inverter 100 and the electric machine 40, and is illustrated as a solid line. Alternatively, each of the AC power buses 105A, 105B, 105C is arranged as a dual wire lead that electrically connects between the multi-phase inverter 100 and the electric machine 40, and is illustrated as the solid line and a dashed line.

The electrified drivetrain 50 includes, in one embodiment, a rotatable member 12 that is coupled via a geartrain 54 to a torque actuator 56 that is in the form of a ground wheel or other device, wherein the torque actuator 56 transfers torque to a ground surface to effect forward motion as part of a propulsion system. The electric machine 40 is controllable to rotate and generate mechanical torque that is transferred via rotatable member 52 and geartrain 54 to the torque actuator 56 when operating in a torque generating mode. The electric machine 40 is controllable to generate AC electric power from mechanical torque originating at the torque actuator 56 via electromagnetic effort, which is transformed by the multi-phase power inverter 100 to DC electric power for storage in the DC power source 20 when operating in an electric power generating mode, such as may occur due to regenerative braking.

A quasi-resonant circuit (QRC) 60 includes elements that are arranged as part of the multi-phase power inverter 100 to effect self-heating of the DC power supply 20, such as when the multi-phase power inverter 100 is operating in a non-traction mode. The QRC 60 is capable of generating an AC current in the positive link 28 of the high-voltage DC bus under certain operating conditions, wherein the AC current results in self-heating of the DC power supply 20 due to interaction of the AC current and the internal resistance thereof. The QRC 60 may utilize elements in the DC power supply 20 to supplement operation thereof.

Figure 2:
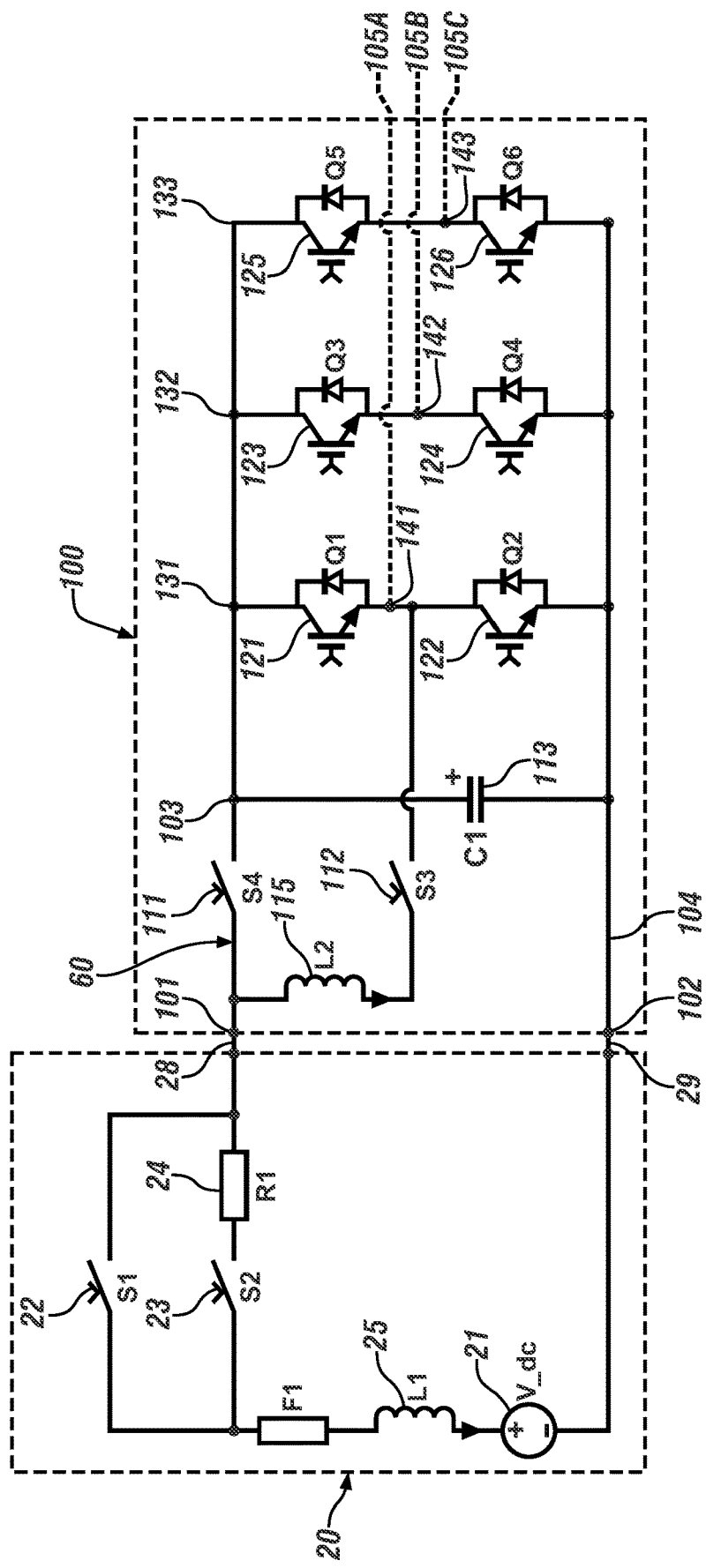
FIG. 2 schematically illustrates an embodiment of a multi-phase inverter system and DC power supply for operating a multi-phase electric machine, in accordance with the disclosure.

Referring now to FIG. 2, with continued reference to the elements of FIG. 1, an embodiment of the multi-phase inverter system 100 that is connected to an embodiment of the DC power supply 20 is illustrated. In one embodiment, and as described herein, the multi-phase inverter system 100 is configured as a three-phase inverter system. The electric machine 40 is configured as a three-phase permanent magnet motor/generator having stator legs arranged in a star configuration in one embodiment. Alternative embodiments of the multi-phase inverter system 100 may include 2-phase, 4-phase, 6-phase, etc., as well as other configurations of the electric machine 40.

In one embodiment, and as illustrated, the DC power supply 20 has an inductor 25 electrically connected in series in the positive link 28 of the high-voltage DC bus.

The DC power supply 20 includes one or a plurality of electric power cells 21, a first cell switch 22 which is arranged in parallel with a second cell switch 23 and electrical resistor 24, and inductor 25, which are arranged to transfer DC electric power to the multi-phase power inverter 100 via the positive link 28 and negative link 29 of the high-voltage DC bus.

The multi-phase inverter system 100 includes, in one embodiment, a plurality of paired switches that are arranged in series between a positive inverter bus 103 and a negative inverter bus 104. The paired switches include in one embodiment and as shown: first paired switches 121 and 122 (Q1 and Q2), which are arranged in series and joined at first switch node 141; second paired switches 123 and 124 (Q3 and Q4), which are arranged in series and joined at second switch node 142; and third paired switches 125 and 126 (Q5 and Q6), which are arranged in series and joined at third switch node 143. Switch 121 of the first paired switches 121 and 122 is connected to the positive inverter bus 103 at drain/collector link 131, and switch 122 is connected to the negative inverter bus 104. Switch 123 of the second paired switches 123 and 124 is connected to the positive inverter bus 103 at drain/collector link 132, and switch 124 is connected to the negative inverter bus 104. Switch 125 of the third paired switches 125 and 126 is connected to the positive inverter bus 103 at drain/collector link 133, and switch 125 is connected to the negative inverter bus 104.

This configuration of the multi-phase inverter system 100 is illustrated and described as having three sets of paired switches, enabling three phase operation. Other embodiments within the scope of this disclosure may include a single set of paired switches (enabling single phase operation), two sets of paired switches (enabling two phase operation), four sets of paired switches (enabling four phase operation), etc., without limitation.

The first switch node 141 is connected to a first phase of the electric machine 40 via the first AC power bus 105A to transfer a pulsewidth modulation signal thereto. The second switch node 142 is connected to a second phase of the electric machine 40 via the second AC power bus 105B to transfer a pulsewidth modulation signal thereto. The third switch node 143 is connected to a third phase of the electric machine 40 via the third AC power bus 105C to transfer a pulsewidth modulation signal thereto.

The first paired switches 121 and 122, second paired switches 123 and 124, and third paired switches 125 and 126 are controlled by controller 30. The first paired switches 121 and 122, second paired switches 123 and 124, and third paired switches 125 and 126 may be silicon carbide (SiC) power electronic devices, gallium nitride (GaN) power electronic devices, insulated gate bipolar transistor (IGBTs) power electronic devices, or other power electronic devices.

A first bus switch 111 is arranged in the positive inverter bus 103 between the positive DC bus terminal 101 and the drain/collector link 131. A second bus switch 112 is arranged between the positive DC bus terminal 101 and the first switch node 141 at which the first paired switches 121 and 122 are joined. The first and second bus switches 111, 112 may be solid-state power electronic devices, e.g., IGBTs, SiCs, GaNs, etc., electromagnetic relays, or other devices. The first and second bus switches 111, 112 are controlled by controller 30.

In one embodiment and as shown, an inverter inductance device 115 is arranged in series between the positive DC bus terminal 101 and the second bus switch 112. The first bus switch 111 and the second bus switch 112 are operatively connected to and controlled by the controller 30. In one embodiment, the inverter inductance device 115 is a wound coil that is sized for the specific application. A capacitor 113 is electrically connected between the positive inverter bus 103 and the negative inverter bus 104.

The QRC 60 is composed of the first cell switch 22, the second cell switch 23, capacitor 113, first and second bus switches 111, 112, and inverter inductance device L2 115. The QRC 60 may utilize the first cell switch 22 and the second cell switch 23 of the DC power supply 20, and may benefit from internal inductance L1 25 thereof to effect heating in the electric power cell(s) 21. In one embodiment, the QRC 60 is operational to effect heating in the electric power cell(s) 21 when first cell switch (S1) 22 is closed, second cell switch (S2) 23 is open, first bus switch (S4) 111 is open, and the second bus switch (S3) 112 is closed, or when the second bus switch (S3) 112 is cycled between an open state and a closed state via pulsewidth-modulation. The QRC 60 is capable of operation when the multi-phase inverter system 100 is controlled in a non-traction mode, which is effected by controlling the first bus switch (S4) 111 in the open state and controlling the second bus switch (S3) 112 in the closed state. The QRC 60 does not operate when the multi-phase inverter system 100 is controlled in a traction mode, which is effected by controlling the first bus switch (S4) 111 in the closed state and controlling the second bus switch (S3) 112 in the open state.

The multi-phase inverter system 100 employs the QRC 60 to selectively control operation in a traction mode and a non-traction mode, and to generate thermal heat in the DC power supply 20 during operation in the non-traction mode. As employed herein, the term "traction mode" refers to operation of the electric power system 10 to generate positive or negative torque, and the term "non-traction mode" refers to other periods of operation in when the electric power system 10 is not generating positive or negative torque, which may enable and/or facilitate thermal heat generation via the inverter inductance device L2 115 in QRC 60.

During operation in the traction mode, the electric power system 10 including the multi-phase inverter system 100 is controlled by controller 30 to operate the electric machine 40 to generate torque. This includes, in one non-limiting example, multi-phase inverter system 100 being controlled to operate the electric machine 40 to provide propulsion torque when the electric power system 10 is an element of the electrified drivetrain 50 for vehicle 15.

Controller 30 operates the electric power system 10 in the traction mode by controlling the first cell switch 22 in an open state, controlling the second cell switch 23 in a closed state, controlling the first bus switch 111 in a closed or conducting state, controlling the second bus switch 112 in an open or non-conducting state, and controlling the multi-phase inverter system 100 in response to an operator request to generate torque using the electric machine 40.

Controller 30 operates the electric power system 10 in the non-traction mode with the QRC 60 being enabled to effect heating in the electric power cell(s) 21 by controlling the first cell switch 22 in a closed state, controlling the second cell switch 23 in an open state, controlling the first bus switch 111 in an open or non-conducting state, controlling the second bus switch 112 in a closed or conducting state, and controlling the multi-phase inverter system 100 in response. Thermal heat is generated in the DC power supply 20 by the AC current flowing therethrough. In one embodiment, the second bus switch 112 is controlled in the closed or conducting state using pulsewidth-modulation or another control sequence.

Figure 3:
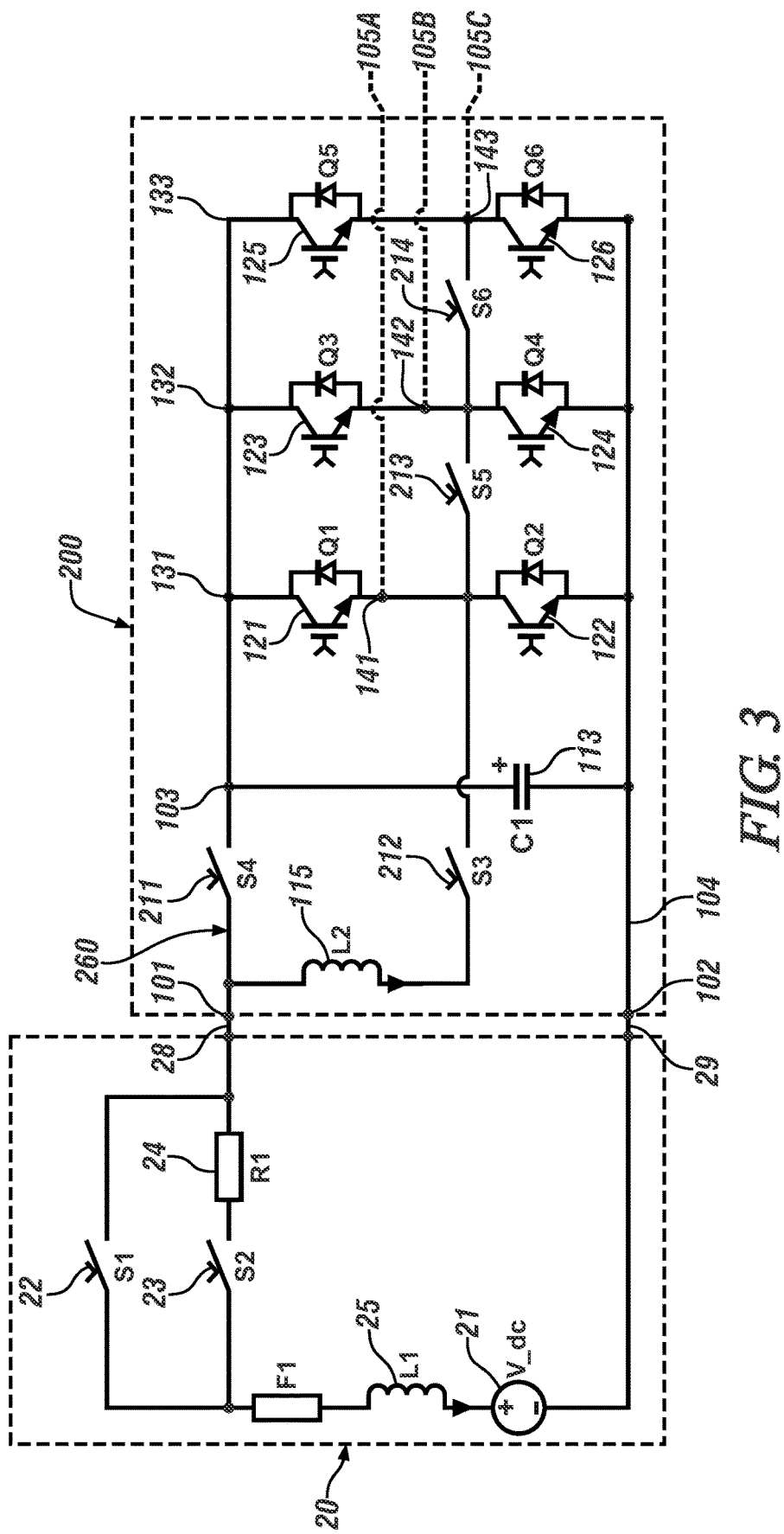
FIG. 3 schematically illustrates another embodiment of a multi-phase inverter system and DC power supply for operating a multi-phase electric machine, in accordance with the disclosure.

Referring now to FIG. 3, with continued reference to elements that are described with reference to FIGS. 1 and 2, another embodiment of a multi-phase inverter system 200 that is connected to an embodiment of the DC power supply 20 with QRC 260 is illustrated. Like numerals refer to like elements in FIGS. 1, 2, and 3.

In this embodiment, first bus switch 211 is arranged in the positive inverter bus 103 between the positive DC bus terminal 101 and the drain/collector link 131. Second bus switch 212 is arranged between the positive DC bus terminal 101 and the first switch node 141 at which the first paired switches 121 and 122 are joined. A third bus switch 213 is arranged between the first switch node 141 and the second switch node 142. A fourth bus switch 214 is arranged between the second switch node 142 and the third switch node 143. The first, second, third, and fourth bus switches 211, 212, 213, 214 may be solid-state power electronic devices, e.g., IGBTs, SiCs, GaNs, etc., electromagnetic relays, or other devices. The first, second, third, and fourth bus switches 211, 212, 213, 214 are controlled by controller 30.

In one embodiment, and as illustrated, the DC power supply 20 has an inductor 25 electrically connected in series in the positive link 28 of the high-voltage DC bus.

The QRC 260 is composed of the first cell switch 22, the second cell switch 23, inverter inductance device L2 115, capacitor 113, and first, second, third, and fourth bus switches 211, 212, 213, 214, respectively. In one embodiment, the inverter inductance device 115 may be omitted, and the QRC 260 may be able to operate with the inductor 25 is arranged in the DC power supply 20 and without presence of an inverter inductance device in the multi-phase inverter system 200 when the magnitude of the inductance is sufficient to effect self-heating in the DC power supply 20.

The multi-phase inverter system 200 employs the QRC 260 to selectively control operation in the traction mode and the non-traction mode, and to generate thermal heat in the DC power supply 20 during operation in the non-traction mode. During operation in the traction mode, the electric power system 10 including the multi-phase inverter system 200 is controlled by controller 30 to operate the electric machine 40 to generate torque. This includes, in one non-limiting example, multi-phase inverter system 200 being controlled to operate the electric machine 40 to provide propulsion torque when the electric power system 10 is an element of the electrified drivetrain 50 for vehicle 15.

Controller 30 operates the electric power system 10 in the traction mode by controlling the first cell switch 22 in an open state, controlling the second cell switch 23 in a closed state, controlling the first bus switch 211 in a closed or conducting state, controlling the second bus switch 212 in an open or non-conducting state, and controlling the multi-phase inverter system 200 in response to an operator request to generate torque using the electric machine 40.

Controller 30 operates the electric power system 10 in the non-traction mode by controlling the first cell switch 22 in a closed state, controlling the second cell switch 23 in an open state, controlling the first bus switch 211 in an open or non-conducting state, controlling the second, third, and fourth bus switches 212, 213, and 214 in sequentially closed or conducting states, and controlling the multi-phase inverter system 200 in response. In one embodiment, the second bus switch 212 is controlled in the closed or conducting state using pulsewidth-modulation or another control sequence. Thermal heat is generated in the DC power supply 20 by the induced AC current.

Figure 4:
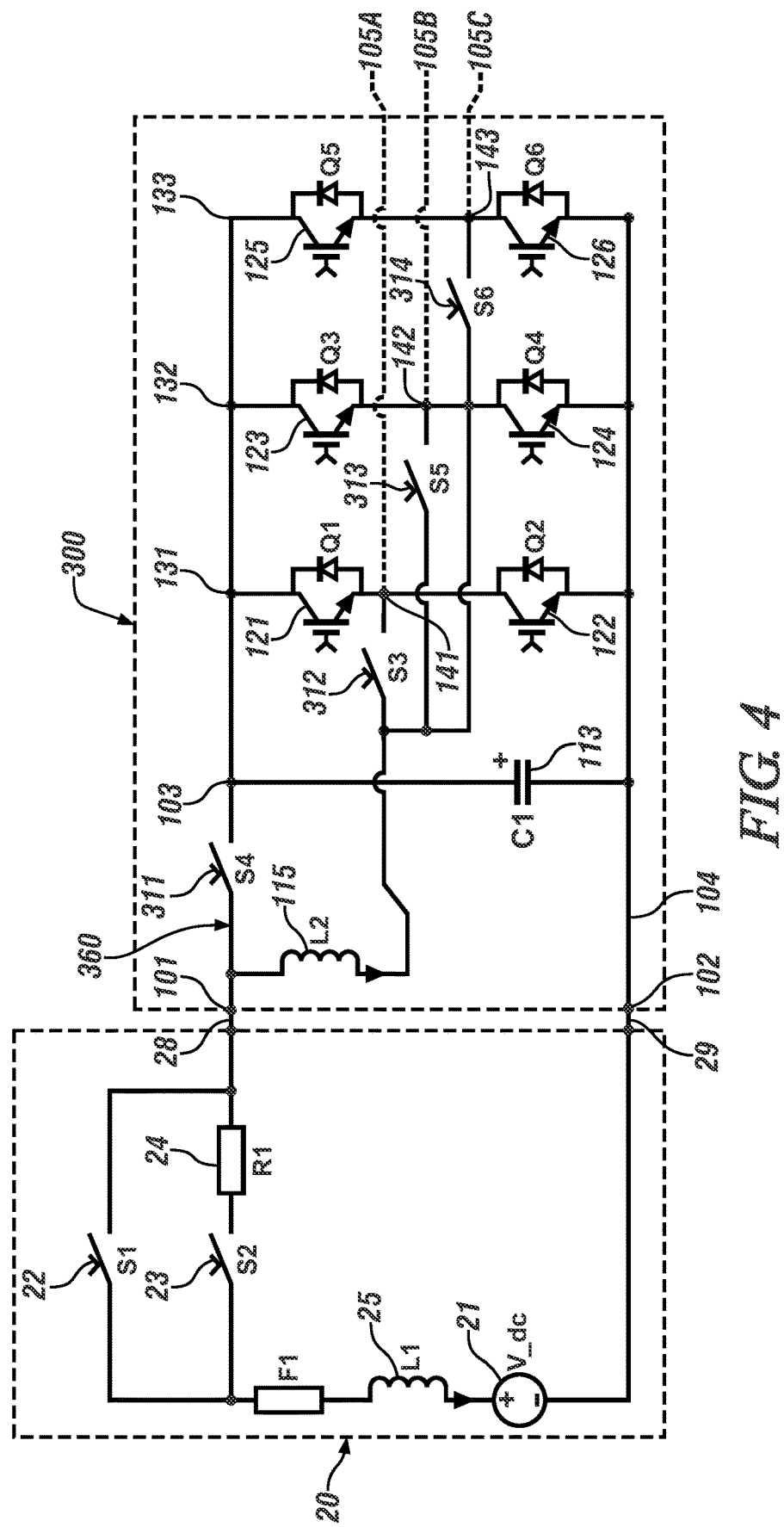
FIG. 4 schematically illustrates another embodiment of a multi-phase inverter system and DC power supply for operating a multi-phase electric machine, in accordance with the disclosure.

Referring now to FIG. 4, with continued reference to elements that are described with reference to FIGS. 1 and 2, another embodiment of a multi-phase inverter system 300 that is connected to an embodiment of the DC power supply 20 is illustrated. Like numerals refer to like elements in FIGS. 1, 2, and 4.

In this embodiment, first bus switch 311 is arranged in the positive inverter bus 103 between the positive DC bus terminal 101 and the drain/collector link 131. Second bus switch 312 is arranged between the positive DC bus terminal 101 and the first switch node 141 at which the first paired switches 121 and 122 are joined. Third bus switch 313 is arranged between the positive DC bus terminal 101 and the second switch node 142. Fourth bus switch 314 is arranged between the positive DC bus terminal 101 and the third switch node 143. The first, second, third, and fourth bus switches 311, 312, 313, 314 may be solid-state power electronic devices, e.g., IGBTs, SiCs, GaNs, etc., electromagnetic relays, or other devices. The first, second, third, and fourth bus switches 311, 312, 313, 314 are controlled by controller 30.

In one embodiment, and as illustrated, the DC power supply 20 has a inductor 25 electrically connected in series in the positive link 28 of the high-voltage DC bus.

The QRC 360 is composed of the first cell switch 22, the second cell switch 23, inverter inductance device L2 115, capacitor 113, and first, second, third, and fourth bus switches 311, 312, 313, 314, respectively. In one embodiment, the QRC 360 is able to operate without presence of the inverter inductance device 115 in the multi-phase inverter system 300 when inductor 25 is arranged in the DC power supply 20.

The multi-phase inverter system 300 employs the QRC 360 to selectively control operation in the traction mode and the non-traction mode, and to generate thermal heat in the DC power supply 20 during operation in the non-traction mode. During operation in the traction mode, the electric power system 10 including the multi-phase inverter system 300 is controlled by controller 30 to operate the electric machine 40 to generate torque. This includes, in one non-limiting example, multi-phase inverter system 300 being controlled to operate the electric machine 40 to provide propulsion torque when the electric power system 10 is an element of an electrified drivetrain 50 for a vehicle 15.

Controller 30 operates the electric power system 10 in the traction mode by controlling the first cell switch 22 in an open state, controlling the second cell switch 23 in a closed state, controlling the first bus switch 311 in a closed or conducting state, controlling the second, third, and fourth bus switches 312, 313, and 314 in open or non-conducting states, and controlling the multi-phase inverter system 300 in response to an operator request to generate torque using the electric machine 40.

Controller 30 operates the electric power system 10 in the non-traction mode by controlling the first cell switch 22 in a closed state, controlling the second cell switch 23 in an open state, controlling the first bus switch 311 in an open or non-conducting state, controlling the second, third, and fourth bus switches 312, 313, and 314 in sequentially closed or conducting states, and controlling the multi-phase inverter system 300 in response. Thermal heat is generated in the DC power supply 20 by current flowing therethrough. In one embodiment, the second, third, and fourth bus switches 312, 313, and 314 are controlled in the closed or conducting state using pulsewidth-modulation or another control sequence.

Figure 5:
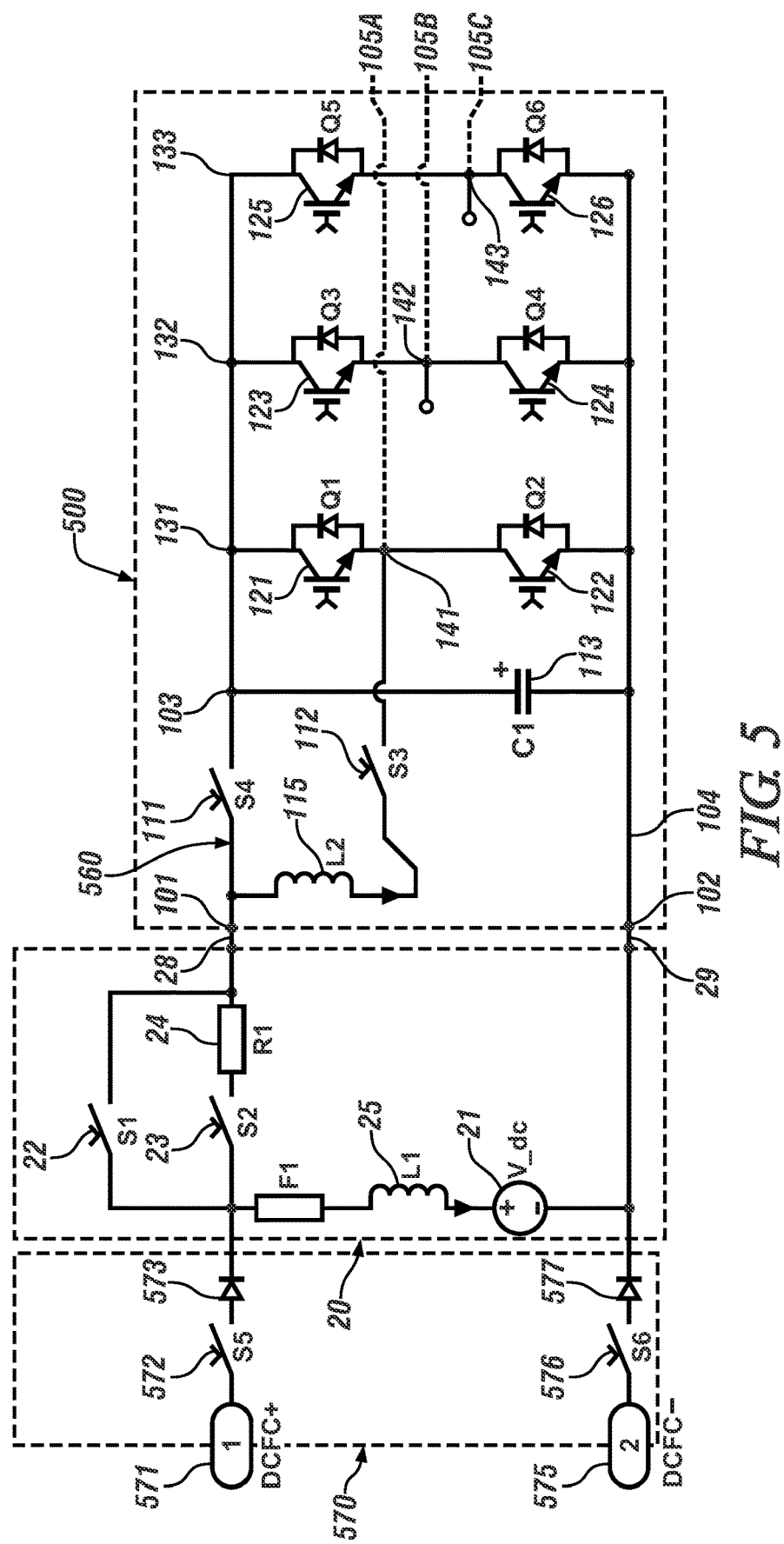
FIG. 5 schematically illustrates another embodiment of a multi-phase inverter system and DC power supply for operating a multi-phase electric machine, in accordance with the disclosure.

Referring now to FIG. 5, with continued reference to the elements of FIGS. 1 and 2, an embodiment of the multi-phase inverter system 500 that is connected to an embodiment of the DC power supply 520 and having an embodiment of QRC 560 is illustrated. In one embodiment, and as described herein, the multi-phase inverter system 500 is configured as a three-phase inverter system, and the electric machine 40 is configured as a three-phase permanent magnet motor/generator. Also illustrated is a charging port 570 for connecting to a stationary charging system (not shown) to the DC power supply 520.

In one embodiment, and as illustrated, the DC power supply 520 has an inductor 25 electrically connected in series in the positive link 28 of the high-voltage DC bus.

The charging port 570 includes a first (positive) power port 571 (DCFC+), positive port switch 572, and first diode 573, which connects to the positive link 28 of the high-voltage DC bus. The first diode 573 is arranged with its anode being towards the first (positive) power port 571 (DCFC+) and its cathode being towards the positive link 28 of the high-voltage DC bus.

The charging port 570 includes a second (negative) power port 575 (DCFC−), negative port switch 576, and second diode 577, which connects to the negative link 29 of the high-voltage DC bus. The second diode 577 is arranged with its cathode being towards the second (negative) power port 572 (DCFC−) and its anode being towards the negative link 29 of the high-voltage DC bus.

The DC power supply 20 includes one or a plurality of electric power cells 21; first cell switch 22, which is arranged in parallel with second cell switch 23 and electrical resistor 24; and inductor 25, all of which are arranged to transfer DC electric power to the multi-phase power inverter 500 via the positive link 28 and negative link 29 of the high-voltage DC bus. Other elements of the multi-phase inverter system 500 are analogous to those described with reference to FIG. 2.

The QRC 560 is composed of the first cell switch 22, the second cell switch 23, inverter inductance device L2 115, capacitor 113, and first and second bus switches 111, 112.

The multi-phase inverter system 100 employs the QRC 560 to selectively control operation in a traction mode and a non-traction mode, which may include a charging event, and to generate thermal heat in the DC power supply 20 during operation in the non-traction mode.

During a charging event, the first and second diodes 573, 577 prevent flow of AC ripple current into the charging device, wherein the AC ripple current may be generated by the inverter 500 during heating of the DC power supply 20 by action of the QRC 560. Thermal heat is generated in the DC power supply 20 by current flowing therethrough.

Figure 6:
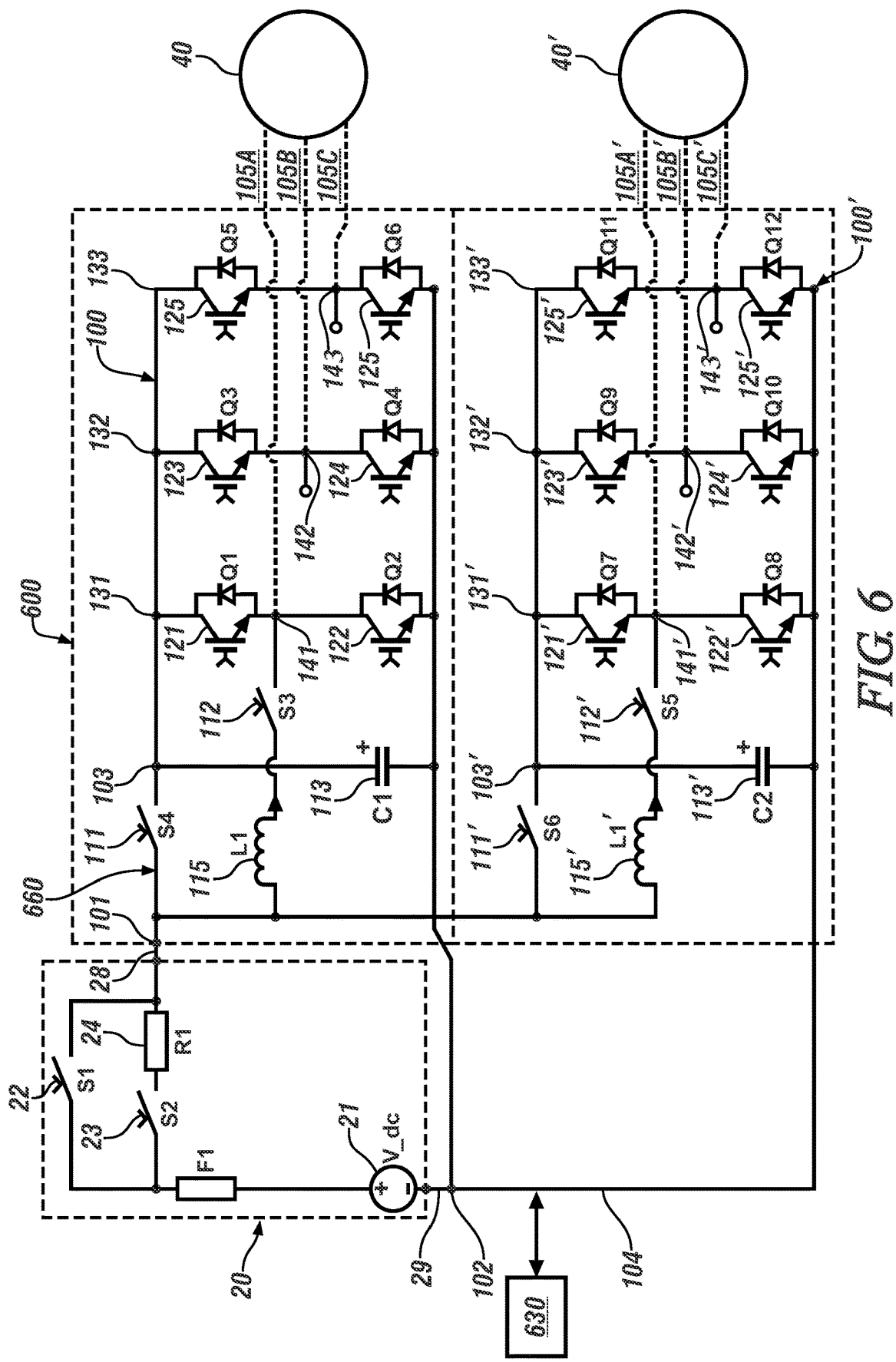
FIG. 6 schematically illustrates another embodiment of a multi-phase inverter system and DC power supply for operating a plurality of multi-phase electric machines, in accordance with the disclosure.

Referring now to FIG. 6, with continued reference to the elements of FIGS. 1 and 2, multi-phase inverter system 600 is illustrated, which includes the DC power supply 20, first and second multi-phase inverters 100, 100', respectively, first and second electric machines 40, 40', respectively, and QRC 660. Operation thereof is controlled by controller 630. The DC power supply 20 is arranged to supply DC electric power to first and second multi-phase inverters 100, 100', respectively, that are coupled to corresponding first and second electric machines 40, 40', respectively.

The QRC 660 is composed of the first cell switch 22, the second cell switch 23, first inductor L1 115, second inductor L2 115', first capacitor C1 113, second capacitor C2 113', and first, second, third, and fourth bus switches 111, 112, 111', and 112', respectively. First and second inverter inductance devices 115, 115' are in this embodiment.

In one embodiment, the first and second electric machines 40, 40' are coupled to respective driveline components to provide for vehicle tractive effort. Alternatively, the first electric machine 40 may be coupled to a non-tractive device, e.g., an air conditioning compressor, and the second electric machine 40' may be coupled to driveline components to provide for vehicle tractive effort. Alternatively, other arrangements of couplings of the first and second electric machines 40, 40' to driven devices such as driveline components and non-tractive devices may be implemented within the scope of this disclosure.

First multi-phase inverter 100 is composed as an embodiment of the multi-phase inverter system 100 that is described in detail with reference to FIG. 2.

Second multi-phase inverter 100' is also composed as another embodiment of the multi-phase inverter system 100 that is described in detail with reference to FIG. 2, in one embodiment. The second multi-phase inverter system 100' includes, in one embodiment, a plurality of paired switches that are arranged in series between a positive inverter bus 103' and negative inverter bus 104. The paired switches include in one embodiment and as shown: first paired switches 121' and 122' (Q1 and Q2), which are arranged in series and joined at first switch node 141'; second paired switches 123' and 124' (Q3 and Q4), which are arranged in series and joined at second switch node 142'; and third paired switches 125' and 126' (Q5 and Q6), which are arranged in series and joined at third switch node 143'. Switch 121' of the first paired switches 121' and 122' is connected to the positive inverter bus 103' at drain/collector link 131', and switch 122' is connected to the negative inverter bus 104'. Switch 123' of the second paired switches 123' and 124' is connected to the positive inverter bus 103' at drain/collector link 132', and switch 124' is connected to the negative inverter bus 104. Switch 125' of the third paired switches 125' and 126' is connected to the positive inverter bus 103' at drain/collector link 133', and switch 125' is connected to the negative inverter bus 104.

In this embodiment, the controller 630 may control the elements of the multi-phase inverter system 600 to simultaneously operate the first and second multi-phase inverters 100, 100' in the traction mode to generate tractive torque under certain operating conditions.

In this embodiment, the controller 630 may control the elements of the multi-phase inverter system 600 to operate the first multi-phase inverter 100 in the non-traction mode to generate thermal heat in the DC power supply 20, and simultaneously operate the second multi-phase inverter 100' in the traction mode to generate tractive torque under certain operating conditions.

Controller 630 controls operation of the first and second multi-phase inverters 100, 100', first and second electric machines 40, 40', and QRC 660 of the multi-phase inverter system 600 in the traction mode by controlling the first cell switch 22 in a closed state, controlling the second cell switch 23 in an open state, controlling the first bus switches 111, 111' in a closed or conducting state, controlling the second, third, and fourth bus switches 112, 112' in open or non-conducting states, and controlling the first and second multi-phase inverters 100, 100' in response to an operator request to generate torque using the first and second electric machines 40, 40', in one embodiment.

Furthermore, controller 630 is able to control operation of the first and second multi-phase inverters 100, 100', first and second electric machines 40, 40', and QRC 660 of the multi-phase inverter system 600 in the traction mode simultaneous with the non-traction mode. This includes controlling the first cell switch 22 in an open state, and controlling the second cell switch 23 in a closed state.

In one embodiment, the first multi-phase inverter 100 is controlled in the non-traction mode to generate heat via the QRC 660. This includes controlling the first bus switch 111 in an open state and controlling the second bus switch 112 in a closed state or a PWM state. Simultaneously, the second multi-phase inverter 100' is controlled in the traction mode to generate traction via second electric machine 40'. This includes controlling the first bus switch 111 in a closed state and controlling the second bus switch 112 in an open state.

The second multi-phase inverter 100' is controlled in response to an operator request to generate torque using the second electric machine 40', in one embodiment.

The concepts described herein provide for an electric power system that includes one or more of a multi-phase inverter system, DC power supply, electric machine, controller, and a quasi-resonant circuit (QRC), wherein control or active elements of the QRC are contained in the multi-phase inverter system in one embodiment, or the control or active elements of the QRC are contained in the multi-phase inverter system and the DC power supply. The QRC is capable of generating an AC current in a DC power bus under certain operating conditions, wherein the AC current generates thermal heat that may effect thermal heat generation that may be employed for heating the DC power supply and/or a vehicle cabin. This includes inducing battery internal impedance to 'self-heat', when vehicle is in motion. Such an arrangement may be more efficient than convective heating.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims.

The invention claimed is:

1. An electric power system, comprising:
a power inverter system having a quasi-resonant circuit (QRC), and a controller;
wherein the power inverter system is arranged to couple a DC power supply to an electric machine;
wherein the power inverter system includes: a positive inverter bus and a negative inverter bus; first paired switches arranged in series between the positive inverter bus and the negative inverter bus and joined at a first switch node; a positive DC bus terminal; and a negative DC bus terminal;
wherein the QRC includes an inverter inductance device, a capacitor, a first bus switch, and a second bus switch;
wherein the capacitor is connected between the positive inverter bus and the negative inverter bus;
wherein the inverter inductance device and the second bus switch are arranged in series between the positive inverter bus and the first switch node arranged between the first paired switches;
wherein the first bus switch is arranged between the positive DC bus terminal and the positive inverter bus; and
wherein the controller is configured to control the QRC to generate an alternating current in the DC power supply.

2. The electric power system of claim 1, wherein the controller being configured to control the QRC to generate the alternating current in the DC power supply comprises the controller being configured to control the first bus switch and the second bus switch to generate, via the inverter inductance device and the capacitor, the alternating current in the DC power supply.

3. The electric power system of claim 1, comprising wherein the controller controls the first bus switch to an open state and the second bus switch to a closed state to generate, via the inverter inductance device and the capacitor, the alternating current in the DC power supply.

4. The electric power system of claim 3, comprising wherein the controller controls the first bus switch to the open state and the second bus switch to the closed state to generate, via the inverter inductance device and the capacitor, the alternating current in the DC power supply to generate thermal energy in the DC power supply.

5. The electric power system of claim 3, further comprising wherein the controller controls the second bus switch in a pulsewidth-modulated condition between an open state and a closed state to generate, via the inverter inductance device and the capacitor, the alternating current in the DC power supply.

6. The electric power system of claim 1, wherein the first switch node is connected via an AC power bus to the electric machine to transfer a pulsewidth modulated power signal thereto.

7. The electric power system of claim 1, further comprising wherein the power inverter system includes: second paired switches arranged in series between the positive inverter bus and the negative inverter bus and joined at a second switch node;
wherein the QRC includes a third bus switch;
wherein the inverter inductance device and the third bus switch are arranged in series between the positive inverter bus and the second switch node arranged between the second paired switches; and
wherein the controller is configured to control the first bus switch, the second bus switch, and the third bus switch to generate, via the inverter inductance device and the capacitor, an alternating current in the DC power supply.

8. The electric power system of claim 7, comprising wherein the controller controls the first bus switch to an open state and one of the second bus switch and the third bus switch to a closed state to generate, via the inverter inductance device and the capacitor, the alternating current in the DC power supply.

9. The electric power system of claim 8, further comprising wherein the controller controls the second bus switch employing a first pulsewidth-modulated signal between an open state and a closed state and wherein the controller controls the third bus switch employing a second pulsewidth-modulated signal to generate, via the inverter inductance device and the capacitor, the alternating current in the DC power supply.

10. The electric power system of claim 1, further comprising wherein the controller controls the power inverter system to operate in a non-traction mode; and
wherein the controller being configured to control the QRC to generate the alternating current in the DC power supply comprises the controller being configured to control the first bus switch and the second bus switch to generate, via the inverter inductance device and the capacitor, the alternating current in the DC power supply during operation in the non-traction mode.

11. An electrified drivetrain, comprising:
a DC power supply, a positive link and a negative link of a DC power bus, a power inverter system having a quasi-resonant circuit (QRC), an electric machine, and a controller;
wherein the electric machine is coupled via a geartrain to a torque actuator;
wherein the power inverter system couples the DC power supply to the electric machine;
wherein the power inverter system includes: a positive inverter bus and a negative inverter bus; first paired switches arranged in series between the positive inverter bus and the negative inverter bus and joined at a first switch node; a positive DC bus terminal; and a negative DC bus terminal;

wherein the positive inverter bus is coupled to the positive link of the DC power bus, and wherein the negative inverter bus is coupled to the negative link of the DC power bus;

wherein the DC power supply includes an electric power cell that is couplable via a first cell switch and a second cell switch to the positive link of the DC power bus;

wherein the first cell switch is arranged in parallel with the second cell switch;

wherein the QRC includes an inductance device, a capacitor, a first bus switch, and a second bus switch;

wherein the capacitor is connected between the positive inverter bus and the negative inverter bus;

wherein the inductance device and the second bus switch are arranged in series between the positive inverter bus and the first switch node arranged between the first paired switches;

wherein the first bus switch is arranged between the positive DC bus terminal and the positive inverter bus; and wherein the controller is configured to control the QRC, the first cell switch, and the second cell switch to generate an alternating current in the DC power supply.

12. The electrified drivetrain of claim 11, wherein the controller being configured to control the QRC to generate the alternating current in the DC power supply comprises the controller being configured to control the first bus switch and the second bus switch to generate, via the inductance device and the capacitor, the alternating current in the DC power supply.

13. The electrified drivetrain of claim 11, comprising wherein the controller controls the first bus switch to an open state and the second bus switch to a closed state to generate, via the inductance device and the capacitor, the alternating current in the DC power supply.

14. The electrified drivetrain of claim 13, comprising wherein the controller controls the first bus switch to the open state and the second bus switch to the closed state to generate, via the inductance device and the capacitor, the alternating current in the DC power supply to generate thermal energy in the DC power supply.

15. The electrified drivetrain of claim 13, further comprising wherein the controller controls the second bus switch in a pulsewidth-modulated condition between an open state and a closed state to generate, via the inductance device and the capacitor, the alternating current in the DC power supply.

16. The electrified drivetrain of claim 11, wherein the first switch node is connected via an AC power bus to the electric machine to transfer a pulsewidth modulated power signal thereto.

17. The electrified drivetrain of claim 11, further comprising wherein the power inverter system includes: second paired switches arranged in series between the positive inverter bus and the negative inverter bus and joined at a second switch node;

wherein the QRC includes a third bus switch;

wherein the inductance device and the third bus switch are arranged in series between the positive inverter bus and the second switch node arranged between the second paired switches; and wherein the controller is configured to control the first bus switch, the second bus switch, and the third bus switch to generate, via the inductance device and the capacitor, an alternating current in the DC power supply.

18. The electrified drivetrain of claim 17, further comprising wherein the controller controls the second bus switch employing a first pulsewidth-modulated signal between an open state and a closed state and wherein the controller controls the third bus switch employing a second pulsewidth-modulated signal to generate, via the inductance device and the capacitor, the alternating current in the DC power supply.

19. The electrified drivetrain of claim 11, further comprising wherein the controller controls the power inverter system to operate in a non-traction mode; and wherein the controller being configured to control the QRC to generate the alternating current in the DC power supply comprises the controller being configured to control the first bus switch and the second bus switch to generate, via the inductance device and the capacitor, the alternating current in the DC power supply during operation in the non-traction mode.

20. An electrified drivetrain for a vehicle, comprising:
a DC power supply, a positive link and a negative link of a DC power bus, a first multi-phase inverter system coupled to a first electric machine, a second multi-phase inverter system coupled to a second electric machine, a first driveline, and a controller;

wherein the positive link of the DC power bus includes a first cell switch, and a second cell switch arranged in series with an inductance device, wherein the first cell switch is arranged in parallel with the second cell switch arranged in series with the inductance device;

wherein the first multi-phase inverter system includes:
a plurality of paired switches, a positive inverter bus, a negative inverter bus, a first bus switch, a second bus switch, a positive DC bus terminal, and a negative DC bus terminal, wherein the positive DC bus terminal is connected to the positive inverter bus, wherein the negative DC bus terminal is connected to the negative inverter bus, wherein each of the plurality of paired switches is arranged in series between the positive inverter bus and the negative inverter bus, wherein each of the plurality of paired switches is joined at a respective switch node, including a first of the plurality of paired switches joined at a first switch node, wherein the first bus switch is arranged on the positive inverter bus between the positive DC bus terminal and the positive inverter bus;

wherein the second bus switch is electrically connected between the positive DC bus terminal and the first switch node of the first of the plurality of paired switches;

wherein the DC power supply is connected via the positive link and the negative link of the DC power bus to the first multi-phase inverter system at the positive DC bus terminal and the negative DC bus terminal, respectively;

wherein the controller is operatively connected to the plurality of paired switches, the first bus switch, the second bus switch, the first cell switch, and the second cell switch; and wherein the controller controls the first bus switch in an open state and the second bus switch in a closed state to generate thermal energy through the first multi-phase inverter system and the inductance device.

* * * * *